United States Patent [19]

Jadamus et al.

[11] Patent Number: 4,948,838
[45] Date of Patent: Aug. 14, 1990

[54] THERMOPLASTIC MOLDING MATERIALS

[75] Inventors: Hans Jadamus, Marl; Martin Bartmann, Recklinghausen, both of Fed. Rep. of Germany

[73] Assignee: Huls Aktiengesellschaft, Fed. Rep. of Germany

[21] Appl. No.: 191,784

[22] Filed: May 4, 1988

Related U.S. Application Data

[63] Continuation of Ser. No. 945,767, Dec. 23, 1986, abandoned.

[30] Foreign Application Priority Data

Jan. 9, 1986 [DE] Fed. Rep. of Germany ....... 3600366

[51] Int. Cl.$^5$ ..................... C08L 51/08; C08L 71/04; C08L 77/00

[52] U.S. Cl. .................................. 525/66; 524/508; 524/514; 524/68; 524/149; 524/181; 524/397; 524/905

[58] Field of Search ................... 525/905, 66

[56] References Cited

U.S. PATENT DOCUMENTS 3,658,949  4/1972  Nakashio et al. .
4,367,311  1/1983  Brandstetter et al. .............. 525/905
4,454,284  6/1984  Ueno et al. .......................... 525/905

Primary Examiner—Jacob Ziegler

[57] ABSTRACT

The invention concerns thermoplastic molding materials comprising a polyphenylene ether, a graft polymer with a hydrocarbon resin as the principal chain and polyphenylene ether side chains, a functionalized polyethylene, a polyamide and optionally other polymers. Molded parts made from these polymer mixtures have improved impact strengths and dimensional stabilities at elevated temperatures.

13 Claims, No Drawings

THERMOPLASTIC MOLDING MATERIALS

This application is a continuation of application Ser. No. 945,767, filed on Dec. 23, 1986, now abandoned.

BACKGROUND OF THE INVENTION

1. Field of the Invention:

The Invention concerns thermoplastic molding materials of a polyphenylene ether, a graft polymer, a functionalized polyethylene, a polyamide and optionally further polymers and additives.

2. Discussion of Background:

Polyphenylene ethers are high-performance industrial thermoplastics with high viscosities and softening points. They are suitable for numerous technical applications in which high temperature stability is important. These polycondensates are described among others in U.S. Pat. No. 3,306,874; 3,306,875; 3,257,357 and 3,257,358. They have, however, the disadvantage that they are brittle. In addition, polyphenylene ethers have poor workability, i.e., due to their high softening points and viscosities, high temperatures and high sheer forces must be applied, which may result in damage to the polymer.

Attempts have therefore been made to improve the workability of polyphenylene ethers and the impact strength of the products by the admixture of other polymers.

Primarily, mixtures of polyphenylene ethers with high impact polystyrene are known.

There are also mixtures of polyphenylene ethers with polyamides. These mixtures have good flowability and good resistance to solvents (DE-AS 16 94 290). Usually, however, brittle products are obtained, as the components are incompatible and they are difficult to disperse into each other. Aromatic polyamides, such as those used for example according to EP-OS 0 131 445 are, furthermore, difficult to work together with polyphenylene ethers. Better compatibility of the two phases may be obtained by the functionalizing of the polphenylene ethers, for example with maleic anhydride, in the presence of radical formers (J 59 066 452). However, the use of radical formers leads to an undesirable and uncontrolled partial gelling of the polyphenylene ether phase.

It has therefore been proposed to increase the compatibility of the two polymers by the addition of an adequate amount of a solvent, for example, an organic phosphate (EP-OS 0 129 825) or a diamide (EP-OS 0 115 218). These technical solutions are not adequate, as the improved compatibility must be purchased by significantly reduced high temperature shape retention. Molding materials to which copolymers of styrene and unsaturated acid derivatives have been added, exhibit the same disadvantage. (See EP-OS 0 046 040).

The object of EP-PS 0 024 120 consists of resin masses consisting of a polyphenylene ether, a polyamide, a third component and optionally of high molecular weight rubber polymers. As the third component, a liquid diene polymer, an epoxy compound or a compound with a double or triple bond and a functional group (such as for example an acid, anhydride, ester, amino or alcohol group) is used. However, the impact strength of the resin material obtained is not sufficient for numerous applications.

SUMMARY OF THE INVENTION

It is the object of the present invention to provide thermoplastic molding materials based on polyphenylene ethers and polyamides, which may be processed into molded parts with an improved impact strength, while largely retaining their high temperature dimensional stability.

This object and other objects of the present invention which will become apparent from the following specification have been achieved by the process and thermoplastic molding materials of the present invention which comprise:

(a) a polyphenylene ether,
(b) a graft polymer containing a hydrocarbon as the main chain and polyphenylene ethers as the side chains;
(c) a functionalized polyethylene,
(d) a polyamide, and
(e) optionally other polymers and additives, which are mixed together in a melt.

DESCRIPTION OF THE PREFERRED EMBODIMENTS

As the initial compounds for the polyphenylene ethers, substituted phenols of the following formula may be used:

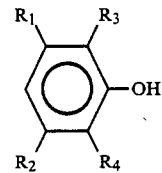

where $R_1$ and $R_2$ are, independently of each other, a methyl or a hydrogen. $R_3$ stands either for hydrogen and $R_4$ for a tertiary alkyl residue with up to 6 carbon atoms, such as for example a tertiary butyl residue, or $R_3$ and or $R_4$ are, independently of each other, an n-alkyl residue with up to 6 carbon atoms. Preferably, 2,6-dimethylphenol is used. Obviously, mixtures of the above-mentioned monomer phenols may also be used. Particularly preferred are poly(2,6-dimethyl-1,4-phenylene ethers) with a limiting viscosity of between 0.4 and 0.7 ml/g (measured in chloroform at 25° C according to DIN 53 728).

The graft polymer has the general formula $A(B)_n$ in which n polyphenylene ether side chains B are attached to the main chain A, which consists of a hydrocarbon, and n is an integer number between 2 and 70, preferably between 5 and 30.

The principal chain A consists preferably of a copolymer of ethylene, an alpha-olefin and a polyene (EPDM resin). Preferred alpha-olefins contain 3 to 10 carbon atoms. The preferred polyenes are dicyclopentadiene, 1,4-hexadiene or ethylidenenorbornenes. The copolymer contains preferably 1 to 10 mole % polyene. The EPDM resin has a molecular weight of at least 1,000; in particular 10,000 to 1,000,000. The molecular weight is preferably between 50,000 and 500,000.

The polyphenylene ether side chains are built up of phenols of the general formula

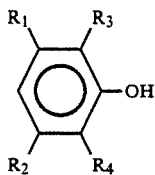

where $R_1$ and $R_2$ are independently of each other, a methyl or preferably a hydrogen. $R_3$ stands for hydrogen and $R_4$ for a tertiary alkyl residue with up to 6 carbon atoms, such as for example the tertiary butyl residue, and $R_3$ and $R_4$ are independently of each other, an n-alkyl residue with up to 6 carbon atoms. 2,6-dimethylphenol is preferably used.

For the initiating members of the side chains, phenols of the general formula

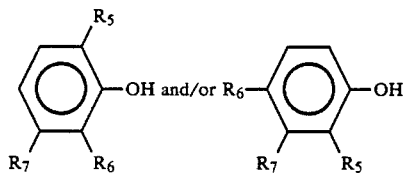

are used where the $R_5$, $R_6$ and $R_7$ residues are a halogen, a phenyl or an n-alkyl residue with up to 6 carbon atoms each, preferably methyl, and the $R_7$ may also be hydrogen.

An unsaturated hydrocarbon resin, such as for example a polyalkenylene or an EPDM, is used to initiate the preparation of the graft polymers. A modified hydrocarbon containing free phenolic hydroxyl groups is prepared by means of catalytic conversion with phenols, for example, such as described in Angew. Makromol. Chem., 24, 205 (1972) and Angew. Makromol. Chem., 74, 17 (1978). In the presence of this product, a phenol suitable for the preparation of the polyphenylene ether side groups B is polymerized by oxidative coupling in the presence of a copper amine catalyst (See German Application P 35 09 093.6, "Hydrocarbon resin-polyphenylene graft polymers and their mixtures with polyphenylene ethers and process for their preparation", filed Mar. 14, 1985). A mixture of a pure polyphenylene ether and a graft polymer is obtained in this manner, from which the latter may be separated by precipitation.

The functionalized polyethylenes are defined according to the present invention as ethylene copolymers containing epoxy, anhydride, carboxylic acid, ester or amide groups. Several of these functional groups may be present simultaneously in the ethylene copolymers.

Methods for the introduction of anhydride, acid or ester groups are described for example in U.S. Pat. No. 3,882,194 and U.S. Pat. No. 3,884,882.

The functionalized polyethylene also includes products prepared from:

(I) polyethylene or copolymers of ethylene with other olefins, which include, for example, the EPDM resins, and (II) an olefinically unsaturated compound containing at least one epoxy, anhydride, carboxylic acid, ester or amide group.

Component (II) may amount to a maximum of 30% by weight with respect to the sum of the components (I) and (II).

If these compounds are prepared by the radical copolymerization of ethylene with epoxy group-containing acrylates, such as for example glycidylacrylate, further comonomers, such as acrylic acid alkylesters and/or vinylacetate, may also be used.

The molecular weights of the functionalized polyethylenes are within a range of 10,000 and 500,000.

The polyamide includes partially crystalline homopolyamides, such as polyamide 6, 11, 12, 66, 69, 610, 612 and their modifications with other dicarboxylic acids, diamines or aminodicarboxylic acids and amorphous polyamides containing, for example, aromatic dicarboxylic acids and cycloaliphatic diamines, may be employed.

The molecular weight of the polyamides, expressed in terms of their relative solution viscosity and measured in m-cresol under the conditions specified in DIN 53 727, is between 1.2 and 2.4.

Rubbers without functionalization, in particular EPDM rubbers, are well suited as the additional polymers which may be added. If a crystallizable, high ethylene compound is used as the functionalized polyethylene, the addition of an additional polymer is particularly useful. EPDM rubbers of the sequence type are preferred in this case. Mixtures of rubbers or mixtures of rubbers with polyalkylenes, for example polyoctenylenes, may also be used.

Other additives include pigments, colorants, fillers, flame retardants, antistatic substances, antioxidants and lubricants.

The components may be mixed together simultaneously in the melt. It is also possible to introduce a mixture of the polyphenylene ether and the graft polymer with the functionalized polyethylene, polyamide and additional polymers in the melt.

Polymer mixtures obtained in this manner are usually tougher than mixtures consisting only of a polyphenylene ether and a polyamide, but they are clearly more brittle than, for example, polyphenylene ether or polyamide molding materials modified for higher impact strength.

Best results are obtained by mixing a melt of the polyamide with a previously prepared melt mixture of the polyphenylene ether, graft polymer, functionalized polyethylene and additional polymer. The process may be carried out in one or two stages.

In the two-stage process, initially, a pre-molding material is prepared from the polyphenylene ether, graft polymer, functionalized polyethylene and additional polymer by melt mixing, which in a second stage, is remelted and mixed together with the polyamide melt.

In the one-stage process, a continuous kneader with several inlets is used, whereby in the first inlet the polyphenylene ether, graft polymer, functionalized polyethylene and additional polymer are introduced, which are then melted and mixed together. Solid or molten polyamide is then added through another inlet.

The melts are mixed together at a mass temperature of 20° to 80° C higher than the melting temperature of the polyamide, but at least 240° C and the mixing process lasts for 30 sec to 5 min.

The molding materials according to the invention are more dimensionally stable at elevated temperatures and have a high impact strength.

Other features of the invention will become apparent in the course of the following descriptions of exemplary embodiments which are given for illustration of the invention and are not intended to be limiting thereof.

EXAMPLES

EXAMPLE 1

A solution of 50 g methanesulfonic acid, 200 g xylene and 200 g 2,6-dimethylphenol is added drop-wise to a mixture of 2 kg EPDM resin (prepared from 48% by weight ethylene, 42% by weight propylene and 10% by weight 5-ethylidene-bicyclo-[2.2.1]-hept-2-ene, Mooney viscosity (1 +4) at 100° C =45HW =160,000) and 17.8 kg 2,6-dimethylphenol at 150° C under a nitrogen atmosphere.

The reaction is allowed to proceed for 4 hr and the mixture is then diluted after cooling to 100° C with 50 kg toluene. After cooling to room temperature, the solution is washed neutral with water and dried over $Na_2SO_4$.

A sample of the solution obtained, containing the modified EPDM resin and 2,6-dimethylphenol, is processed. Analysis shows that the modified EPDM resin has a phenol content of 1.5% by weight (after IR and UV).

EXAMPLE 2

A mixture of 140 kg toluene, 26 kg methanol, 3.6 kg morpholine and a solution of 0.2 kg $CuCO_3$ in 0.7 kg hydrobromic acid (48%) are placed into a stirred vessel. The solution of 2,6-dimethylphenol and modified EPDM resin in toluene is added over a period of 30 min. With stirring (250 rpm) and the introduction of a flow of air of 8 $m^3$/hr the solution of 2,6-dimethylphenol and modified EPDM resin in toluene is added over a period of 30 min. Sixty minutes after the completion of the addition, the polycondensation is discontinued by quenching with aqueous acetic acid. The polymer mixture is precipitated by the addition of methanol to the organic phase and then filtered and dried.

```
Yield = 19 kg
    J = 75 ml/g
  NMR: 22% H aromatic,     δ = 6.5 (s);
       68% H Ar—CH3,       δ = 2.1 (s);
        7% H Alkyl-CH2,    δ = 1.3 (m);
        3% H Alkyl-CH3,    δ = 0.9 (m)
```

According to GPC analysis, a mixture of 75% by weight pure poly(2,6-dimethyl-1,4-phenylene ether) (PPE) and 25% by weight of a PPE-EPDM graft polymer was present.

$M_W$(PPE)=approx. 35,000

$M_W$(PPE/EPDM)=approx. 400,000

The polymer mixture contains 10% by weight EPDM resin.

EXAMPLES 3 to 7, COMPARATIVE EXAMPLES A and B

The composition and notched impact strength of the polymer mixtures are given in Table 1.

In Examples 3 and 4 and Comparative Example A the polymer mixtures are prepared in a single stage in a continuous kneader.

In Examples 5 to 7 and Comparative Example B, initially, a premolding mass is prepared which is then mixed with polyamide 12 in the melt.

To each of the mixtures, with respect to the total mixture, 0.5% by weight didecylphenyl-phosphite (commercial product: IRGASTAB® CH 300 of Ciba-Geigy), 0.5% by weight 3-(3,5-di-tert-butyl-4-hydroxyphenyl)-propionic acid-octadecylester (commercial product IRGANOX® 1076 of Ciba-Geigy) and 1.5% by weight oxidized polyethylene wax with a molecular weight of 1,500 (commercial product: VESTOWAX® AO 1539, manufacturer: HULS AG) are added.

Cylinder temperature in all of the experiments was 280° C.

TABLE 1

| Example | Polymer mixture | | | Notched impact strength (kJ/$m^2$) |
|---|---|---|---|---|
| A | 15 parts | PPE | | |
|   | 5 parts | EPDM-PPE[1] | | 5 |
|   | 80 parts | PA 12 | | |
| 3 | 15 parts | PPE | | |
|   | 5 parts | EPDM | | 7 |
|   | 5 parts | PE with epoxy groups[3] | | |
|   | 80 parts | PA 12 | | |
| 4 | 15 parts | PPE | | |
|   | 5 parts | EPDM-PPE | | |
|   | 5 parts | PE with epoxy groups | | 13 |
|   | 5 parts | EPDM | | |
|   | 80 parts | PA 12 | | |
| 5 | 15 parts | PPE | Premolding mass | |
|   | 5 parts | EPDM-PPE | Premolding mass | 29 |
|   | 5 parts | PE with epoxy groups | Premolding mass | |
|   | 80 parts | PA 12 | Premolding mass | |
| 6 | 15 parts | PPE | Premolding mass | No fracture |
|   | 5 parts | EPDM-PPE | Premolding mass | |
|   | 5 parts | PE with epoxy groups | Premolding mass | |
|   | 5 parts | EPDM | Premolding mass | |
|   | 80 parts | PA 12 | Premolding mass | |
| B | 18 parts | PPE[4] | Premolding mass | |
|   | 7 parts | EPDM | Premolding mass | 7 |
|   | 75 parts | PA 12 | Premolding mass | |
| 7 | 15 parts | PPE | Premolding mass | |
|   | 5 parts | EPDM-PPE | Premolding mass | 15 |
|   | 5 parts | functionalized EPDM[5] | | |
|   | 75 parts | PA 12 | | |

Notes for Table 1:
[1]In keeping with Example 2, a mixture of 75% by weight PPE and 25% by weight EPDM-PPE graft polymer is used. The mixture contained 10% by weight EPDM resin.
[2]Polyamide 12 with Eta$_{rel}$ = 2.15
[3]Ethylene-acrylic acid-glycidylester copolymer with 5% by weight acrylic acid-glycidylester, $M_v$ = 38,000
[4]PPE with J = 55 ml/g
[5]VESTAMID® X 4496, manufacturer: Huls AG, D-4370 Marl, FRG Obviously, numerous modifications and variations of the present invention are possible in light of the above teachings. It is therefore to be understood that within the scope of the appended claims, the invention may be practiced otherwise than as specifically described herein:

What is claimed is:

1. A thermoplastic molding material comprising:
   (a) a polyphenylene ether, 1
   (b) a graft polymer, comprising a hydrocarbon as the principal chain and polyphenylene ether as the side chains said graft polymer being prepared by oxidative coupling in the presence of a copper-amine catalyst, (c) a functionalized polyethylene, and (d) a polyamide.

2. The thermoplastic molding material of claim 1, wherein said polyphenylene ether is a poly(2,6-dimethyl-1,4-phenylene ether) with a viscosity of 0.4 to 0.7 ml/g.

3. The thermoplastic molding material of claim 1, wherein said graft polymer comprises:

(i) a principal chain;

(ii) initiating phenol groups of the formula

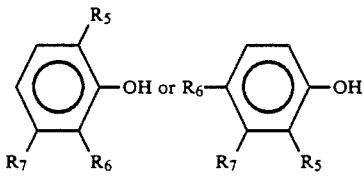

which are attached to said principal chain; and (iii) side chain phenol groups of the formula

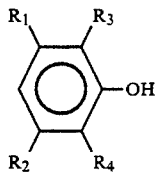

bonded to the oxygen atom of said initiating phenol groups, wherein $R_1$ and $R_2$ are, independently of each other, a methyl or hydrogen; $R_3$ is hydrogen and $R_4$ is a tertiary alkyl group with up to 6 carbon atoms or $R_3$ and $R_4$ are, independently of each other, an n-alkyl group with up to 6 carbon atoms; and $R_5$ and $R_6$ are a halogen, a phenyl group or an n-alkyl group with up to 6 carbon atoms; and $R_7$ is a halogen, a phenyl group, an n-alkyl group with up to 6 carbon atoms or a hydrogen.

4. The thermoplastic molding material of claim 3, wherein $R_1$ and $R_2$ are hydrogen.

5. The thermoplastic molding material of claim 3, wherein $R_5$, $R_6$ and $R_7$ are methyl groups.

6. The thermoplastic molding material of claim 1, wherein said side chains are poly(2,6-dimethyl-1,4-phenylene ether).

7. The thermoplastic molding material of claim 1, wherein said principal chain is derived from a copolymer of ethylene, an alpha-olefin and a polyene.

8. The thermoplastic molding material of claim 1, wherein on the average per molecule, 2–70 said side chains are attached to said principal chain.

9. The thermoplastic molding material of claim 8, wherein on the average per molecule, 5–30 said chains are attached to said principal chain.

10. The thermoplastic molding material of claim 1, wherein said functionalized polyethylene is an ethylene copolymer comprising epoxy, anhydride, carboxylic acid, ester or amide groups.

11. The thermoplastic molding material of claim 1, wherein said functionalized polyethylene is a product prepared by the reaction of (i) polyethylene or ethylene copolymers with other olefins; and (ii) olefinically unsaturated compounds containing at least one epoxy, anhydride, carboxylic acid, ester or amide group 12. The thermoplastic molding material of claim 1, wherein said polyamide is a partially crystalline homopolyamide with a relative viscosity of 1.2–2.4.

13. A thermoplastic molding material comprising:

(a) polyphenylene ether, (b) a graft polymer, comprising a hydrocarbon as the principle chain and polyphenylene ether as the side chains, wherein said principle chain is a copolymer of ethylene, an alpha-olefin and a polyene, (c) a functional polyethylene, wherein said functionalized polyethylene is an ethylene copolymer comprising epoxy, anhydride, carboxylic acid, ester or amide groups, and (d) a polyamide.

* * * * *

UNITED STATES PATENT AND TRADEMARK OFFICE
CERTIFICATE OF CORRECTION

PATENT NO. : 4,948,838
DATED : AUGUST 14, 1990
INVENTOR(S) : HANS JADAMUS ET AL.

It is certified that error appears in the above-identified patent and that said Letters Patent is hereby corrected as shown below:

Title page, item [73]:
  In the Assignee, please insert the city of --Marl--.

Title page (before item [57] ABSTRACT):
  Please insert --Attorney, Agent, or Firm - Oblon, Spivak, McClelland, Maier & Neustadt, P.C.--.

Signed and Sealed this

Third Day of March, 1992

Attest:

HARRY F. MANBECK, JR.

Attesting Officer

Commissioner of Patents and Trademarks